Feb. 21, 1967 T. J. SCUITTO 3,305,843

DISPLAY APPARATUS

Filed Dec. 16, 1963 3 Sheets-Sheet 1

THOMAS J. SCUITTO
INVENTOR.

BY Samuel Lindenberg
Arthur Fredrich

ATTORNEYS

Feb. 21, 1967 T. J. SCUITTO 3,305,843

DISPLAY APPARATUS

Filed Dec. 16, 1963 3 Sheets-Sheet 2

INVENTOR.
THOMAS J. SCUITTO
BY Samuel Lindenberg
Arthur Friedrich
ATTORNEYS

THOMAS J. SCUITTO
INVENTOR.
BY Samuel Lindenberg
Arthur Freilich
ATTORNEYS

United States Patent Office 3,305,843

Patented Feb. 21, 1967

3,305,843
DISPLAY APPARATUS

Thomas J. Scuitto, Malibu, Calif., assignor to Wyle Laboratories, El Segundo, Calif., a corporation of California Filed Dec. 16, 1963, Ser. No. 330,843
7 Claims. (Cl. 340—172.5)

This invention relates generally to display apparatus and more particularly to a relatively simple, inexpensive, and reliable apparatus for displaying numeric data.

U.S. patent application Ser. No. 314,387, filed Oct. 7, 1963, entitled "Calculator Apparatus," and assigned to the same assignee as the present application, discloses an electronic apparatus for performing arithmetic operations, which apparatus in its preferred embodiment is characterized by the use of both a digital memory including a plurality of registers for storing numbers, and a display device for continually displaying the contents of those registers. Each stored number can be comprised of a plurality of digits and the value of each digit is represented by the number of marks or pulses recorded in the corresponding memory digit sector. As mentioned in the cited patent application, any of several different display devices could be used for displaying the stored digits.

It is an object of the present invention to provide a particularly simple, inexpensive, and reliable display apparatus suitable for use with the above-mentioned calculator apparatus.

More specifically, it is an object of the present invention to provide an apparatus which is responsive to a total number of pulses sensed during each of a plurality of successive periods for displaying successive digits each corresponding to the total number of pulses sensed during a different period.

In accordance with the invention, a cathode ray tube is provided together with means for generating sine and cosine signals. By selectively applying either the sine or cosine signal to the cathode ray tube deflection means and by simply manipulating bias and amplitude levels and signal polarity, the tube beam can be caused to trace any desired decimal digit.

More particularly, in response to the serial sensing of pulses recorded in a cyclic digital memory, a first counter is incremented during each digit period to a state corresponding to the number of pulses sensed during that period. At the end of each digit period, the count in the first counter is transferred to a second counter which can comprise a static register, whose output is decoded. The output sets up certain logic gates which are enabled during different bit periods during the subsequent digit period. The logic gates control the application of the sine and cosine signals to the cathode ray tube horizontal (X) and vertical (Y) deflection means and in addition determine whether a full or half amplitude signal should be applied. The logic gates are also capable of selectively reversing the polarity of the signal applied to the deflection means and of applying different levels of direct current bias thereto. Further, a beam blanking circuit is provided which is also responsive to the logic gates.

A significant feature of the invention involves the means for synchronizing the operation of the display apparatus with the operation of the digital memory. A source of clock pulses, preferably in the form of a clock track provided in the memory, supplies a clock pulse during each bit period. The clock pulses are used to increment a bit (B) counter. A digit (D) counter whose states define different digit periods is incremented in response to each cycle of the B counter. A word (W) counter is incremented in response to each cycle of the D counter. The states of the W and D counters are coupled to the cathode ray tube deflection means through respective digital-to-analog converters for positioning each display digit. Gating means are provided which are responsive to each state of the W counter for coupling the output of a different memory register to the logic gates. Synchronization between the display apparatus and the digital memory is assured by utilizing the square wave output signal developed by the B counter to generate the sine and cosine signals used to control the cathode ray tube beam deflection.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
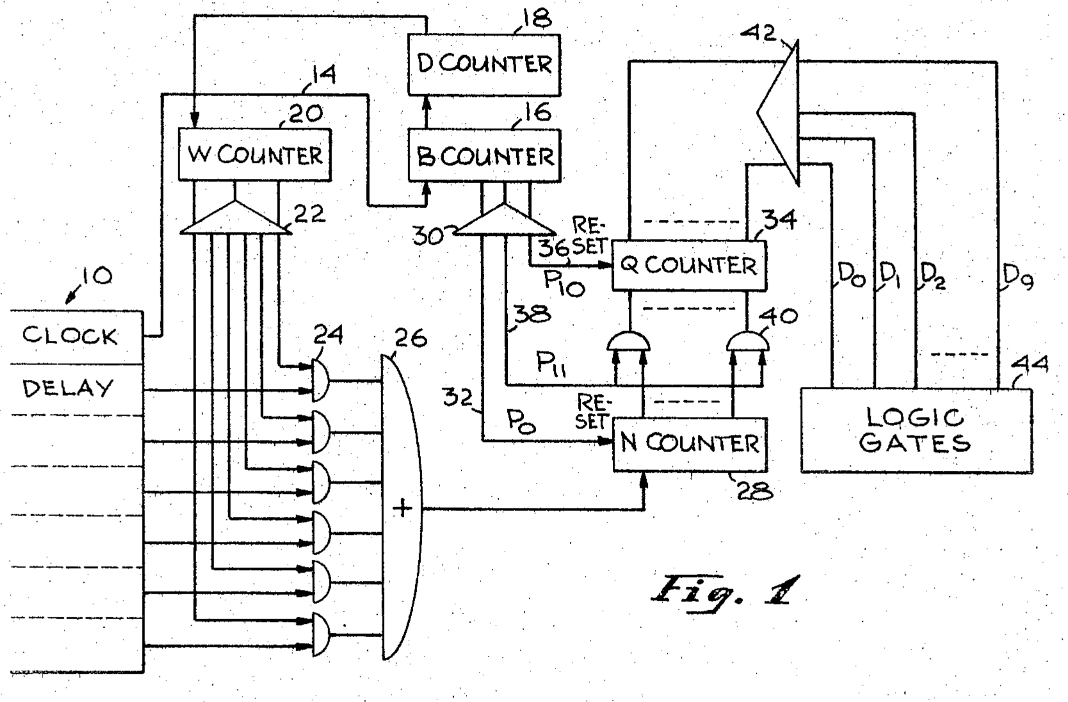
FIGURE 1 is a logical block diagram illustrating the apparatus for coupling a digital memory to logic gates for controlling the application of signals to cathode ray tube deflection means.

Attention is now called to FIGURE 1 which illustrates a digital memory 10 of the cyclic type, such as a magnetic drum or disc, from which information is accessed in a serial manner. It is assumed that the memory 10 includes six register tracks and a clock track. Each of the register tracks is divided into a plurality of digit sectors, each digit sector capable of containing sufficient information to represent a decimal digit. Thus, a register track comprised of twenty-four digit sectors can represent a twenty-four decimal digit number. Each digit sector includes a plurality of bit positions, herein arbitrarily assumed to be twelve. The initial bit position ($P_0$) and the last two bit positions ($P_{10}$, $P_{11}$) in each digit sector are provided for control purposes. The nine intermediate bit positions ($P_1$–$P_9$) in each digit sector are utilized to store a mark or pulse. The number of pulses recorded in each digit sector defines the value of the decimal digit stored in that sector.

The clock track has a pulse recorded in alignment with each bit position around the surface of the disc or drum. The output of the clock track is coupled through conductor 14 to an incrementing input terminal of a B counter 16. The B counter is a scale of twelve counter and consequently has a cycle time equal to the time it takes for stored information to be read from a complete digit sector.

The B counter 16 is coupled to a D counter 18 such that in response to each complete cycle of the B counter, the D counter is incremented by one. Thus, the state of the D counter at all times indicates the digit sector in the memory which is in position to be read. The D counter 18 is coupled to a W counter 20 such that the W counter is incremented in response to cycles of the D counter. The W counter is a scale of six counter and functions to successively couple the information stored in each of the register tracks to the display apparatus to be described hereinafter. The output terminals of the W counter 20 are coupled through a decoding circuit 22. The decoding circuit 22 is provided with six output terminals, each one of which is connected to the input of a different And gate 24. The second input to each of the And gates 24 is connected to the readout head associated with a different one of the register tracks of memory 10. The outputs of all of the And gates 24 are coupled to the input of an Or gate 26. The output of Or gate 26 is connected to the incrementing input terminal of an N counter 28.

A decoding circuit 30 is connected to the output terminals of the B counter 16. The decoding circuit 30 is provided with twelve output terminals, each of which is selectively energized in response to a different state of the B counter. Decoding network output conductor 32 is energized in response to the B counter defining its initial state or bit period $P_0$. Conductor 32 is connected to the reset input terminal of N counter 28 such that at the beginning of each scan of a digit sector, the N counter 28 is cleared. During the subsequent bit periods of that digit sector, the N counter is incremented in accordance with the number of pulses sensed on the register track associated with the enabled And gate 24. A different And gate 24 will be enabled in response to each different state of the W counter 20.

The Q counter 34, like the N counter 28 is capable of defining ten different states, each different state corresponding to a different decimal digit. Output conductor 36 of the decoding circuit 30 is connected to the Q counter reset input terminal and is energized when the B counter 16 defines bit period $P_{10}$. In the subsequent bit period, conductor 38 is energized to enable transfer gates 40 which cause the contents of the N counter to be transferred into the Q counter.

The output terminals of the Q counter are connected to the input of a decoding network 42 which is provided with ten output terminals respectively identified as $D_0$, $D_1$, and $D_2$ through $D_9$. A different one of the decoding circuit 42 output terminals is energized in response to each possible state of the Q counter 34. The output terminals of decoding circuit 42 are coupled to logic gates 44 forming part of the signal modifying apparatus of FIGURE 2. The signal modifying apparatus is comprised of two identical portions for respectively modifying signals applied to the cathode ray tube X and Y deflection means. These two portions are identical in structure and differ only in the inputs provided to the various logic gates 44 contained therein.

Figure 2:
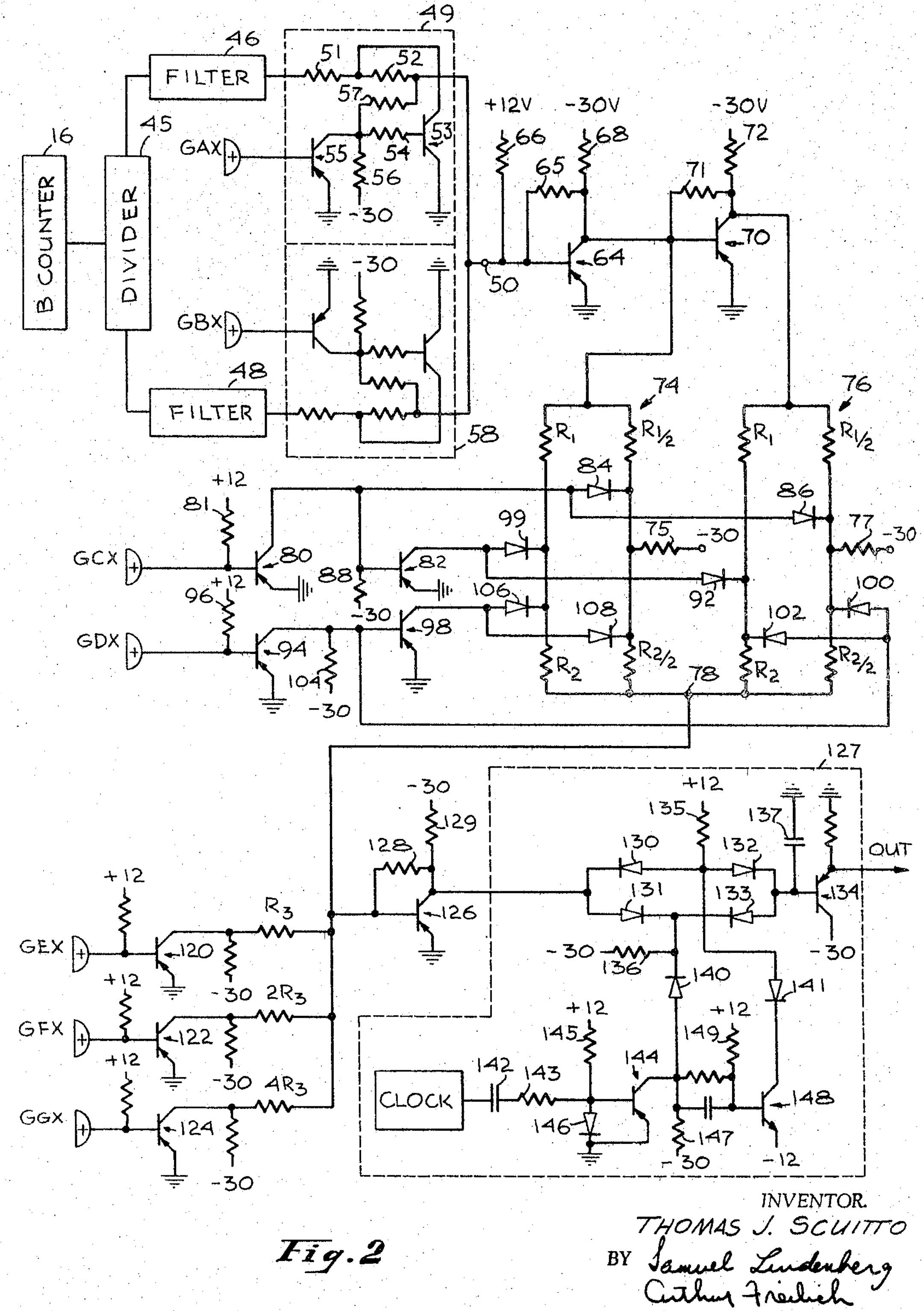
FIGURE 2 is a schematic diagram of the signal modifying apparatus utilized to control the X deflection means.

As will be seen hereinafter, sine and cosine signals, properly modified, can be applied to the X and Y deflection means of a cathode ray tube to cause the cathode ray tube beam to trace any decimal digit. Signal modification in accordance with the invention involves three distinct aspects. Initially, either a sine, cosine, or zero signal can be applied to the deflection means at full or half amplitude. Secondly, the sine or cosine signal can be applied to the deflection means with normal or reversed polarity and thirdly, the modified sine or cosine signal can be impressed upon any one of three direct current bias levels. In addition, the cathode ray tube beam can be blanked where necessary. FIGURE 2 illustrates the apparatus for modifying the signal applied to the X deflection means. The apparatus for modifying the signal applied to the Y deflection means is identical except for the inputs to the various logic gates. Inputs to the gates of FIGURE 2 have not been illustrated on the drawings and instead are represented in the chart of Table I and the logical equations of Table II set forth hereinafter.

As noted, the B counter 16 is incremented in response to each clock pulse derived from the clock track of memory 10. The output of the B counter 16 comprises a square wave which is applied to a divider circuit 45 which in turn provides a square wave output signal whose frequency is equal to one-fourth of the frequency of the frequency of the B counter output signal. The output of the divider circuit is applied to filters 46 and 48 to respectively develop sine and cosine wave signals of the same frequency as the signal provided by circuit 45.

The output of filter 46 is connected in series with a switching circuit 49 which, under the control of gate $G_{AX}$ selectively couples the filter output signal to the switching circuit output terminal 50. Switching circuit 49 includes a pair of serially connected resistors 51 and 52. Connected to the junction between resistors 51 and 52 is the collector of a grounded emitter PNP transistor 53. The base of transistor 53 is coupled through resistor 54 to the collector of a grounded emitter PNP transistor 55 which is controlled by the output of gate $G_{AX}$. Resistors 56 and 57 respectively couple the collector of transistor 55 to a −30 volt potential and to terminal 50. When gate $G_{AX}$ is enabled, transistor 55 conducts so that approximately ground potential appears on the collector thereof thus cutting off transistor 53. A sine wave signal provided by filter 46 is thus coupled through resistors 51 and 52, impressed upon a negative bias level established by the potential drop across resistor 57, to output terminal 50. When gate $G_{AX}$ is not enabled, transistor 53 is forward biased thereby clamping the junction between resistors 51 and 52 to substantially ground potential and the sine wave signal supplied by filter 46 is not coupled to terminal 50. Switching circuit 58, identical to circuit 49, couples filter 48 to terminal 50 and is controlled by gate $G_{AX}$.

The output terminal 50 is connected to the base of a PNP transistor amplifier 64 whose emitter is grounded. The base of transistor 64 is connected through a resistor 66 to a source of positive potential, nominally shown as +12 volts. The collector of transistor 64 is connected through resistor 68 to a source of negative potential nominally shown as −30 volts. The collector of transistor 64 is also connected to the base of transistor amplifier 70 whose emitter is grounded and whose collector is connected through a resistor 72 to the −30 volt source. Feedback resistors 65 and 71 respectively couple the collectors of transistors 64 and 70 to their bases.

It should be apparent that if a sine wave is applied to the base of transistor 64, as would be the case if transistor 54 were forward biased, the sine wave would appear at the collector of transistor 70 and a signal having a reverse polarity would appear at the collector of transistor 64. Similarly, if a cosine signal were applied to the base of transistor 64, the cosine signal would appear at the collector of transistor 70 and a signal of opposite polarity would appear at the collector of transistor 64.

The collectors of transistors 64 and 70 are respectively connected to identical resistance networks 74 and 76. Each of the networks includes a left-hand series path comprised of a pair of resistors R1 and R2 and a right-hand series path comprised of a pair of resistors respectively having values of R1/2 and R2/2. Both resistance networks 74 and 76 are connected to the junction 78. The junctions defined in the right-hand series branches of each network are coupled through compensating resistors 75 and 77 to the −30 volt potential source.

It should be apparent that a current entering junction 78 will be of one polarity if permitted to traverse the resistance network 74 and of an opposite polarity if permitted to traverse the resistance network 76. On the other hand, it should be apparent that regardless of which resistance network the current traverses, it will be of full amplitude if it traverses the right-hand circuit branch and of half amplitude if it traverses the left-hand circuit branch. Control over the amplitude of the current is exercised by gate $G_{CX}$ and control over the polarity of the signal appearing at junction 78 is exercised by gate $G_{DX}$.

The output of gate $G_{CX}$ is connected to the base of transistor 80 whose emitter is grounded. The base of transistor 80 is connected through a resistor 82 to a source of positive potential. The collector of transistor 80 is connected to the base of transistor 82 and to the anodes of diodes 84 and 86. The cathodes of diodes 84 and 86 are respectively connected to the junctions between the resistances in the right-hand branches of networks 74 and 76. The base of transistor 82 is connected through a resistance 88 to the —30 volt source. The emitter of transistor 82 is grounded and the collector thereof is connected to the anode of diodes 90 and 92. The cathodes of diodes 90 and 92 are connected to the junctions between the resistances in the left-hand branches in networks 74 and 76.

When a negative input signal is applied to the gate $G_{CX}$, transistor 80 is forward biased and thus clamps the junctions in the right-hand branches of the networks 74 and 76 to ground. Thus, the current flow through junction 78 is inhibited from traversing the right-hand branches. On the other hand, when a negative input signal is not applied to gate $G_{CX}$, then transistor 80 is off-biased so that diodes 90 and 92 clamp the junctions of the left-hand branches in circuits 74 and 76. Thus, when transistor 82 is forward biased, the current through junction 78 selects either of the right-hand branches of networks 74 and 76.

The particular network, i.e. either 74 or 76 is selected dependent upon the inputs to gate $G_{DX}$. The output of gate $G_{DX}$ is connected to the base of transistor 94. The base of transistor 94 is connected through resistor 96 to a source of positive potential and the emitter thereof is grounded. The collector of transistor 94 is connected to the base of transistor 98 and to the anodes of diodes 100 and 102. The cathodes of diodes 100 and 102 are respectively connected to the junctions in the right and left-hand branches of the network 76. The base of transistor 98 is connected through resistor 104 to the —30 volt source and the emitter thereof is grounded. The collector of transistor 98 is connected to the anodes of diodes 106 and 108 whose cathodes are respectively connected to the junctions in the left and right-hand branches of network 74.

When negative input signals are applied to neither gate $G_{CX}$ nor gate $G_{DX}$ transistors 80 and 94 are off-biased and transistors 82 and 98 are forward biased. Thus, current into the junction 78 transverses the right-hand branch in network 76. On the other hand, when negative input signals are applied to both gates $G_{CX}$ and $G_{DX}$ transistors 80 and 94 are forward biased and thus the active current path is the left-hand branch in network 74. The right-hand branch in network 74 is chosen when transistor 80 is off-biased and transistor 94 is forward biased. The left-hand branch in network 76 is chosen when transistor 80 is forward biased and transistor 94 is off-biased. Thus, it can be seen that the current flowing into junction 78 can be controlled with respect to its amplitude and polarity. Compensating resistors 75 and 77 are used to cause the sine and cosine wave signals to oscillate about the same voltage level regardless of whether half or full value currents are coupled.

The alternating current signal appearing at junction 78 is impressed upon a direct current bias level which is dependent upon which of transistors 120, 122, or 124 is forward biased. The output of Or gates $G_{EX}$, $G_{FX}$, and $G_{GX}$, are respectively connected to the bases of transistors 120, 122, and 124. The bases of each of these transistors is connected through a resistor to the source of positive potential while the emitters of each of these transistors are connected to ground. The collector of transistor 120 is connected through a resistor R3 to the junction 78. The collectors of transistors 122 and 124 are respectively connected through resistors having values 2R3 and 4R3 to the junction 78. Additionally the collectors of transistors 120, 122, and 124 are each connected through resistors to the —30 volt source. If it is assumed that the D.C. bias level presented at junction 78 when the transistor 122 is forward biased represents a zero bias level, then the bias level presented when transistor 120 is forward biased and transistors 122 and 124 are off-biased can be considered as a full positive bias level. When both transistors 122 and 124 are forward biased, the D.C. bias level presented at junction 78 can be considered to be a positive half bias level. When transistor 124 is forward biased and transistors 120 and 122 are off-biased, then the D.C. level presented at junction 78 can be considered as a negative half bias level. When none of transistors 120, 122, and 124 is forward biased, a negative full bias level is presented. The voltage variations at junction 78 are applied to transistor amplifier 126 and thence through a transient removal circuit 127 to adder circuitry in FIGURE 4 for application to the deflection means of a cathode ray tube.

The emitter of transistor amplifier 126 is grounded and the collector thereof is connected through a feedback resistor 128 to the base thereof. Resistor 129 connects the collector to a —30 volt potential. The transient removal circuit 127 is used to remove switching transients which arise when, for example, the signal applied to the deflecting means of the display cathode ray tube 12 is abruptly switched from a sine to a cosine wave signal. The circuit 127 operates by momentarily decoupling the output of transistor amplifier 126 from the adder circuitry in FIGURE 4 in response to each pulse derived from the clock track in FIGURE 1.

Circuit 127 includes diodes 130 and 131 which respectively have their cathode and anode connected to the collector of transistor 126. The anode of diode 130 is connected to the anode of diode 132 whose cathode is connected to the base of transistor 134. The cathode of diode 131 is connected to the cathode of diode 133 whose anode is connected to the base of transistor 134. The junction defined between the anodes of diodes 130 and 132 is connected through a resistor 135 to a +12 volt potential. The junction defined between the cathodes of diodes 131 and 133 is connected through a resistor 136 to a —30 volt potential. The base of transistor 134 is connected through a capacitor 137 to ground. In normal operation, the sine or cosine wave signal appearing at the collector of transistor 126 is coupled through diodes 130, 131, 132, and 133 to transistor 134. Current continually flows from the +12 volt source through resistor 135 and diode pairs 130, 131 and 132, 133 through the resistor 136 to the —30 volt source. The voltage swing appearing at the collector of transistor 126 is consequently reflected at the base of transistor 134.

Figure 4:
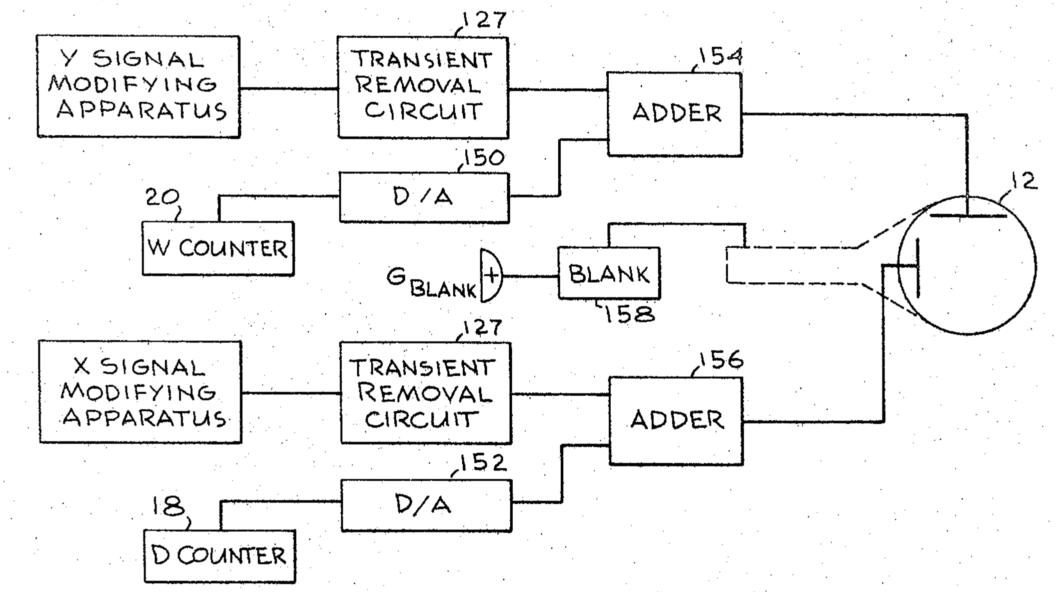
FIGURE 4 is a block diagram illustrating the apparatus coupling the X and Y modifying apparatus to the cathode ray tube deflection means.

In order to prevent switching transients from being coupled to the adder circuitry of FIGURE 4, the transistor 126 is effectively decoupled from the transistor 134 each time a clock pulse is generated. This is accomplished through the utilization of circuitry coupled to the anode of diode 140 and the cathode of diode 141. The cathode of diode 140 is connected to the junction between the cathodes of diodes 131 and 133 and the anode of diode 141 is connected to the junction between the anodes of diodes 130 and 132. A negative signal is applied to capacitor 142 in response to a clock pulse. Capacitor 142 is coupled through resistor 143 to the base of transistor 144. The base of transistor 144 is coupled through resistor 145 to a +12 volt source and through a diode 146 to ground. The emitter of transistor 144 is grounded. The collector of transistor 144 is connected to the anode of diode 140. Thus, the application of a negative signal to capacitor 142 forward biases transistor 144 thereby clamping the junction between diodes 131 and 133 at ground. The collector of transistor 144 is connected through a resistor 147 to a —30 volt potential and through a parallel RC circuit to the base of transistor 148. The base of transistor 148 is connected through a resistor 149 to a +12 volt source. The emitter of transistor 148 is connected to a —12 volt source. When transistor 144 is forward biased, a positive potential is coupled to the base of transistor 148 and it becomes forward biased thereby applying a negative clamping potential to the junction between diodes 130 and 132. Thus, whereas the signal appearing at the collector of transistor 126 is normally coupled to the base of transistor 134, it is not coupled for a short interval after each clock pulse thereby preventing any switching transients from being applied to the adder circuitry of FIGURE 4 and appearing on the cathode ray tube 12.

Figure 3:
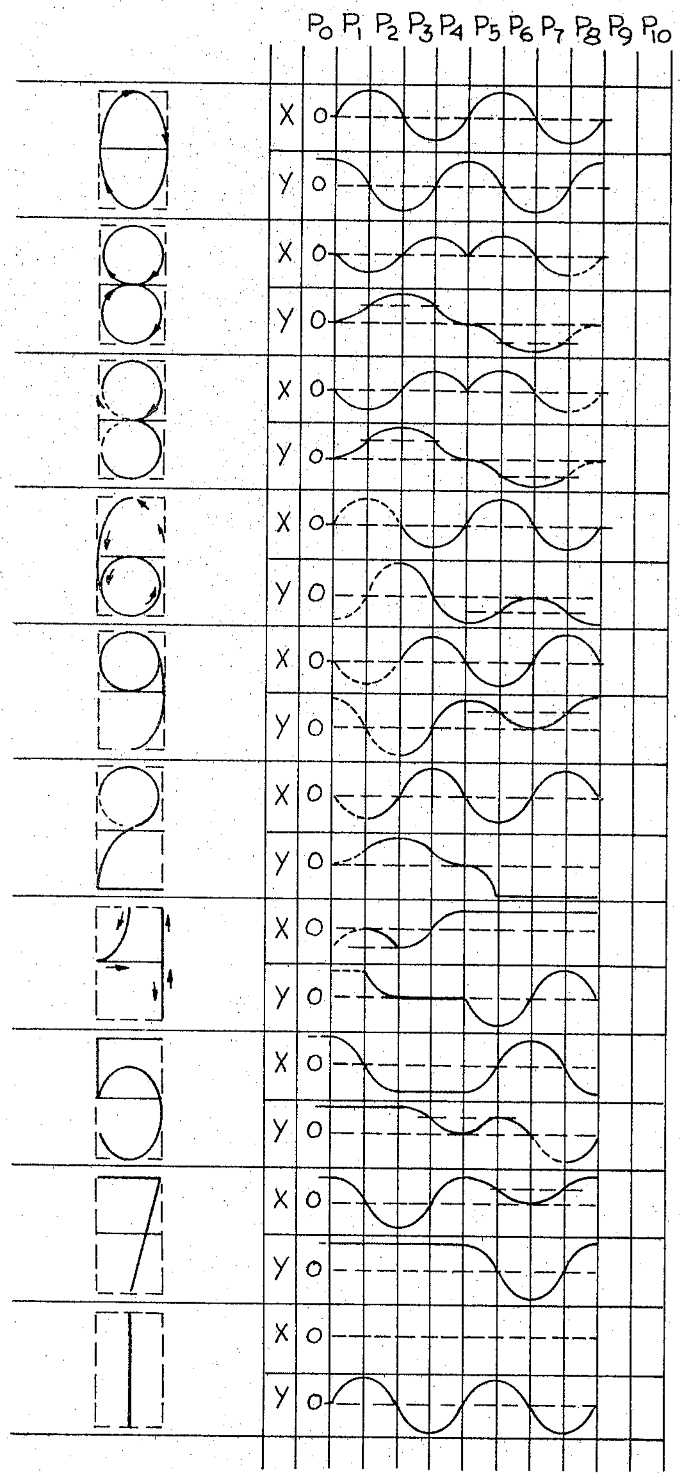
FIGURE 3 is a chart illustrating the shapes of each of the deflection signals developed to cause the cathode ray tube beam to trace each decimal digit.

The apparatus illustrated in FIG. 2 is employed to control the X deflection means of a cathode ray tube. As previously noted, identical apparatus, except for the inputs to the various gates, is utilized to control the Y deflection means. Attention is now called to FIGURE 3 which illustrates the various waveforms applied to the X and Y deflection means for causing the cathode ray tube beam to trace the various decimal digits. Table I illustrates the bit periods during which each gate is enabled to cause the tracing of each of the different digits. The symbol $P_D$ is used to represent the bit periods $P_1$ through $P_8$.

periods $P_1$ through $P_4$ and a negative half value direct current voltage bias is impressed during periods $P_5$ through $P_8$. The digit 3 is traced identically to the digit 8 except however that the cathode ray tube beam is blanked during periods $P_1$ and $P_8$ In order to cause the beam to trace the digit 6, the beam is blanked during periods $P_1$ and $P_2$. At the beginning of period $P_3$ the horizontal deflection signal is at zero and begins to go negative. The vertical deflection signal is at a maximum positive and begin to go toward zero. Thus, the starting point for the beam trace is at the vertical top and horizontal center of the elemental display area and during period $P_3$ the beam is caused to move to the vertical center and left side of the elemental area. During period $P_4$ the beam is moved back to the horizontal center but to the vertical bottom of the elemental display area. It is to be noted that with the normal values of the X and Y deflection signals, the vertical deflection of the

TABLE I

| | | $G_A$ | $G_B$ | $G_C$ | $G_D$ | $G_E$ | $G_F$ | $G_G$ | $G_{BLANK}$ |
|---|---|---|---|---|---|---|---|---|---|
| 0 | X | $P_D$ | | | | | $P_0+P_D$ | | |
| | Y | | $P_D$ | | | | $P_D$ | | |
| 8 | X | $P_D$ | | | $P_1$–$P_4$ | | $P_0+P_D$ | | |
| | Y | | $P_D$ | $P_D$ | $P_1$–$P_4$ | | $P_1$–$P_4$ | $P_D$ | |
| 3 | X | $P_D$ | | | $P_1$–$P_4$ | | $P_0+P_D$ | | |
| | Y | | $P_D$ | $P_D$ | $P_1$–$P_4$ | | $P_1$–$P_4$ | $P_D$ | $P_1$, $P_8$. |
| 6 | X | $P_D$ | | | | | $P_0+P_D$ | | $P_1$, $P_2$. |
| | Y | | $P_D$ | $P_5$–$P_8$ | $P_D$ | | $P_1$–$P_4$ | $P_5$–$P_8$ | |
| 9 | X | $P_D$ | | | $P_D$ | | $P_0+P_D$ | | $P_1$, $P_2$. |
| | Y | | $P_D$ | $P_5$–$P_8$ | | | $P_5$–$P_8$ | $P_5$–$P_8$ | |
| 2 | X | $P_D$ | | | $P_D$ | | $P_0+P_D$ | | $P_1$. |
| | Y | | $P_0$–$P_5$ | $P_1$–$P_4$ | $P_1$–$P_4$ | | $P_1$–$P_4$ | $P_1$–$P_4$ | |
| 4 | X | $P_1$, $P_2$ | $P_3$, $P_4$ | | | $P_5$–$P_8$ | $P_3$, $P_4$ | | $P_1$. |
| | Y | $P_5$–$P_8$ | $P_2$ | | $P_5$–$P_8$ | $P_1$, $P_2$ | $P_3$–$P_8$ | | |
| 5 | X | | $P_1$, $P_2$, $P_5$–$P_8$ | | $P_5$–$P_8$ | $P_0$ | $P_1$, $P_2$, $P_5$–$P_8$ | | |
| | Y | $P_5$–$P_8$ | $P_3$, $P_4$ | $P_1$–$P^6$, $P_8$ | $P_1$–$P_4$ | $P_0$, $P_1$, $P_2$ | $P_3$–$P_7$ | $P_3+P_4+P_8$ | |
| 7 | X | | $P_D$ | $P_5$–$P_8$ | | $P_0$ | $P_D$ | $P_5$–$P_8$ | |
| | Y | | $P_5$–$P_8$ | | | $P_0$, $P_1$–$P_4$ | $P_5$–$P_8$ | | |
| 1 | X | | | | | | $P_0+P_D$ | | |
| | Y | $P_D$ | | | | | $P_0+P_D$ | | |

Thus, in order to cause a cathode ray tube beam to trace the digit 0, a sine wave is applied to the X deflection means and a cosine wave is applied to the Y deflection means. During bit period $P_0$, gate $G_{EY}$ is enabled so as to establish the initial level of the signal applied to the Y deflection means. Note that the illustrated waveforms will in fact cause the beam to trace the decimal digit "0." At the beginning of bit period $P_1$ the valve of the signal applied to the X deflection means is zero and consequently the beam is positioned in the horizontal center of an elemental tube area. The value of the signal applied to the Y deflection means is at a maximum and the beam is therefore positioned at the upper portion of an elemental tube area. At the end of period $P_1$ the X deflection signal has become maximum and the Y deflection signal has fallen to zero to therefore cause the beam to be deflected to the center of the right side of the elemental display area. At the end of period $P_2$ the X deflection signal is zero, causing the beam to again be positioned in the horizontal center of the area and the Y deflection signal is at its negative maximum to therefore position the beam at the bottom of the elemental area. During period $P_3$ the beam is swept to the vertical center and left-hand side of the elemental area and during period $P_4$ the beam is returned to the top horizontal center of the elemental area. During periods $P_5$ through $P_8$ the digit is merely retraced.

In order to trace the digit 8 a sine wave is applied to the X deflection means, the sine wave being reversed during periods $P_1$ through $P_4$. A cosine wave is applied to the Y deflection means with its amplitude being reduced to half value through periods $P_1$ through $P_8$. The polarity of the cosine waveform is reversed during periods $P_1$ through $P_4$ while a positive half value direct current bias is impressed upon the vertical deflection signal during beam is actually twice that of the horizontal deflection. In order to equate the deflections, the gate $G_{CY}$ is enabled so that a half value of the vertical deflection amplitude is selected. Gate $G_{CY}$ is enabled during period $P_5$ and in addition the vertical deflection signal is impressed upon a negative half value direct current bias level. At the end of period $P_5$ the beam is positioned at the right-hand side of the elemental area approximately one-quarter of the way up from the bottom of the area. During period $P_6$ the beam is moved to the geometrical center of the area and during period $P_7$ the beam is swept to a position at the left edge of the area approximately one-quarter of the way up from the bottom.

The digit 9 is traced in substantially the same manner as the digit 6 but however the polarity of the horizontal and vertical deflection signals are reversed and instead of using a negative half value bias level, a positive half value bias level is employed.

The remaining digits, i.e., 2, 4, 5, 7, and 1 are traced by the utilization of techniques identical to that described for the previously referred to digits. The movement of the beam can be determined by considering the variations in the deflection signals applied to the X and Y deflection means. The S and Y deflection signals can be caused to vary in the manner illustrated in the waveforms of FIGURE 3 by enabling the gates in accordance with the entries in Table I. Logical equations representing the input terms which must be applied to the various gates of FIGURE 2 are set forth in Table II.

TABLE II.—X GATE LOGIC $$P_D = P_1+P_2+P_3+P_4+P_5+P_6+P_7+P_8$$

$$G_{AX} = P_D\cdot(D_0+D_8+D_3+D_6+D_9+D_2)+(P_1+P_2)D_4$$

$$G_{BX} = (P_3+P_4)\cdot D_4+(P_1+P_2+P_3+P_6+P_7+P_8)D_5 + P_D D_7$$

$$G_{CX} = (P_5+P_6+P_7+P_8)D_7$$
$$G_{DX} = (P_1+P_2+P_3+P_4)D_8+(P_1+P_2+P_3+P_4)D_3 +P_DD_9+P_DD_2+(P_5+P_6+P_7+P_8)D_5$$
$$G_{EX} = (P_5+P_6+P_7+P_8)D_4+P_0(D_5+D_7)$$
$$G_{FX} = P_0(D_0+D_8+D_3+D_6+D_9+D_2+D_4+D_1) +P_D(D_0+D_8+D_3+D_6+D_9+D_2+D_7+D_1) +(P_3+P_4)D_4+(P_1+P_2+P_5+P_6+P_7 +P_8)D_5$$
$$G_{GX} = (P_5+P_6+P_7+P_8)D_7$$
$$G_{BLANK} = (P_1+P_8)D_3+(P_1+P_2)D_6+(P_1+P_2)D_9 +P_1D_2+P_1D_4$$
$$G_{AY} = (P_5+P_6+P_7+P_8)D_4+(P_5+P_6 +P_7+P_8)D_5+P_DD_1$$
$$G_{BY} = P_D(D_0+D_8+D_3+D_6+D_9)+(P_1+P_2+P_3 +P_4+P_5(D_2+P_2D_4+(P_3+P_4)D_5+(P_5 +P_6+P_7+P_8)D_7$$
$$G_{CY} = P_D(D_8+D_3)+(P_5+P_6+P_7+P_8)D_6 +(P_5+P_6+P_7+P_8)D_9+(P_1+P_2+P_3 +P_4)D_2+(P_1+P_2+P_3+P_4+P_5 +P_6+P_8)D_5$$
$$G_{DY} = (P_1+P_2+P_3+P_4)D_8+(P_1+P_2+P_3+P_4)D_3 +P_DD_6+(P_1+P_2+P_3+P_4)D_2+(P_1+P_2 +P_3+P_4)D_4+(P_1+P_2+P_3+P_4)D_5$$
$$G_{EY} = P_0(D_0+D_5+D_7)+(P_1+P_2)(D_4+D_5 +(P_1+P_2+P_3+P_4)(D_7)$$
$$G_{FY} = P_0(D_8+D_3+D_6+D_9+D_2+D_4+D_1)+P_D(D_0 +D_9+D_1)+(P_1+P_2+P_3+P_4)(D_8+D_3+D_6 +D_2)+(P_3+P_4+P_5+P_6+P_7+P_8)D_4+(P_5 +P_6+P_7+P_8)D_7+(P_3+P_4+P_5+P_6+P_7)D_5$$
$$G_{GY} = P_D(D_8+D_3)+(P_1+P_2+P_3+P_4)D_2+(P_5+P_6 +P_7+P_8)(D_6+D_9)+(P_3+P_4+P_8)D_5$$

Thus, it should be recognized that the signals developed at junction 78 by both the X and Y signal modifying apparatus are useful for causing the beam to trace a digit designated by the energized output terminal of encoding circuit 42 of FIGURE 1, in an elemental area whose position is designated by the states of the W and D counters. That is, it will be recalled that for each state of the W counter, the contents of a different one of the registers is applied to the N counter and through the Q counter to the decoding circuit 42. It should also be recalled that for each successive state of the D counter, information representing successive digits stored in each register is accessed. Thus, by causing the state of the W counter to control the vertical position of the elemental area, and by causing the state of the D counter to control the horizontal position of the elemental area, all of the digits in each register can be displayed as they would be conventionally written, i.e. in a horizontally extending line. The contents of each of the registers would be vertically spaced from one another as a result of the output of the W counter controlling the vertical deflection means. FIGURE 4 illustrates the apparatus for coupling the deflection signals to the display cathode ray tube 12. The output of the W and D counters 20 and 18 are respectively applied to the inputs of digital-to-analog converters 150 and 152. The outputs of the digital-to-analog converters 150 and 152 are respectively applied to the inputs of adder circuits 154 and 156. The output of amplifiers 126 associated with the Y and X signal modifying apparatus respectively are also coupled to the inputs of adder circuits 154 and 156. The output of adder circuit 154 is coupled to the vertical deflection means of tube 12 and the output of adder 156 is connected to the horizontal deflection means thereof.

The output of gate $G_{BLANK}$ referred to in Table I is connected to the input of a blanking circuit 158 which is connected to a control grid in tube 12 for selectively blanking the display.

From the foregoing, it should be appreciated that a display apparatus has herein been provided which can be suitably used with a source of serially supplied pulses wherein the total number of pulses supplied during each digit period represents a digit to be displayed. The source of serial pulses can comprise a digital memory of the cyclic type such that it functions to inherently repeatedly provide information signals which are particularly suitable for refreshing cathode ray tube displays. The provided signals are employed to activate appropriate means for modifying sine and cosine signals for application to the cathode ray tube vertical and horizontal deflection means for appropriately deflecting the tube beam to cause it to trace selected digits. Appropriate modification of the sine and cosine signals merely involves selecting either a full or half value amplitude and either a normal or reverse polarity and then impressing that modified signal upon either a full or half valued direct current bias level which can also be either positive or negative. It should be apparent that in deflecting the cathode ray tube beam, it will not always move with constant speed in tracing various parts of the various figures and as a consequence noticeable intensity variations may occur. By providing a feedback system for varying the intensity in accordance with the applied voltages, these intensity variations can be avoided.

What is claimed is:

1. In combination with a source of pulse signals, each signal randomly occurring during a different one of successive bit periods, means for counting the total number of pulse signals occurring during each of a plurality of successive digit periods, each digit period comprised of a predetermined number of bit periods, and for displaying a plurality of digits, each digit representing the total number of pulses counted during a different digit period, said means including:

a first counter;

means for incrementing said first counter in response to each of said pulse signals;

a second counter;

means for clearing said first counter and for transferring the count therein to said second counter once during each of said digit periods;

decoding means having a plurality of output terminals and responsive to each possible count in said second counter for energizing a different one of said output terminals;

means for generating sine wave and cosine wave signals;

first and second signal modifying circuits each having an input terminal and an output terminal;

means responsive to the energized decoding means output terminal for selectively applying either said sine wave signal or said cosine wave signal to the input terminals of said first and second signal modifying circuits during each of said bit periods;

means in each of said signal modifying circuits responsive to said energized output terminal for selectively reducing the amplitude of the signal applied thereto during each of said bit periods;

means in each of said signal modifying circuits responsive to said energized output terminal for selectively reversing the polarity of the signal applied thereto during each of said bit periods;

means in each of said signal modifying circuits responsive to said energized output terminal for applying a selected direct current bias level signal to the corresponding signal modifying circuit output terminal during each of said bit periods;

a cathode ray tube including beam generating means and horizontal and vertical beam deflecting means; and means for respectively coupling said first and second signal modifying circuit output terminals to said horizontal and vertical deflecting means.

2. The combination of claim 1 wherein said source of pulse signals comprises a cyclic memory including a plurality of register tracks and a clock track, each track having a readout means coupled thereto;

switching means for successively coupling a different register track readout means to said first counter;

a cyclic bit counter;

means responsive to pulses stored on said clock track for incrementing said bit counter;

a cyclic digit counter; and means responsive to each cycle of said bit counter for incrementing said digit counter.

3. The combination of claim 2 wherein said means for generating said sine wave and cosine wave signals includes filter means coupled to said bit counter.

4. The combination of claim 2 including a cyclic word counter;

means responsive to each cycle of said digit counter for incrementing said word counter; and means coupling said word counter to said switching means for causing a different register track readout means to be coupled to said first counter in response to each different state of said word counter.

5. The combination of claim 4 including first and second digital-to-analog converters respectively coupled to the output of said digit and word counters; and means respectively coupling the output of said first and second digital-to-analog converters to said horizontal and vertical deflecting means.

6. Display apparatus responsive to each of a plurality of different numeric signals applied thereto for displaying a different numeric character, said apparatus comprising:

a cathode ray tube including beam generating means and horizontal and vertical beam deflecting means;

a source of sine wave signals;

a source of cosine wave signals;

a source of timing signals defining successive periods;

horizontal and vertical signal modifying circuits each having an input terminal and an output terminal;

first and second input gate means responsive to each of said plurality of different numeric signals for respectively selectively applying during each of said periods, either said sine wave signal or said cosine wave signal to said input terminals of said horizontal and vertical signal modifying circuits;

first logic means in each of said signal modifying circuits responsive to each of said plurality of different numeric signals for selectively reducing the amplitude of the signal applied thereto during each of said periods;

second logic means in each of said signal modifying circuits responsive to each of said plurality of different numeric signals for selectively reversing the polarity of the signal applied thereto during each of said periods;

third logic means in each of said signal modifying circuits responsive to each of said plurality of different numeric signals for applying a selected direct current bias level signal to each of said signal modifying circuit output terminals; and means for respectively connecting said horizontal and vertical signal modifying circuit output terminals to said horizontal and vertical beam deflecting means.

7. The combination of claim 6 wherein each of said signal modifying circuits includes first and second impedance networks, each having at least two parallel circuit branches having different impedance values;

means in each of said signal modifying circuits for applying the signal applied thereto to said first network and for applying an opposite polarity signal to said second network;

said first logic means comprising means for steering current through selected ones of said branches;

said second logic means comprising means for steering current through a selected one of said networks.

No references cited.

ROBERT C. BAILEY, *Primary Examiner.*

P. J. HENON, *Assistant Examiner.*